United States Patent [19]
Mori

[11] Patent Number: 5,375,450
[45] Date of Patent: Dec. 27, 1994

[54] METHOD OF MANUFACTURING COUPLINGS

[76] Inventor: Takuo Mori, 301, Meguro 3-1-7 Meguro-ku, Tokyo 153, Japan

[21] Appl. No.: 108,892

[22] Filed: Aug. 18, 1993

[30] Foreign Application Priority Data

Jun. 22, 1993 [JP] Japan ................... 5-173569

[51] Int. Cl.⁵ ............................................. B21D 41/02
[52] U.S. Cl. .................................. 72/393; 29/890.15; 285/252; 285/259
[58] Field of Search ............ 285/258, 225, 239, 382.4, 285/382.5, 252, 328; 29/890.15; 72/353.4, 353.6, 393

[56] References Cited

U.S. PATENT DOCUMENTS

| | | | |
|---|---|---|---|
| 1,166,059 | 12/1915 | Ledbetter | 285/239 |
| 3,989,280 | 11/1976 | Schwarz | 285/239 |
| 5,082,314 | 1/1992 | Aubry et al. | 285/239 X |
| 5,190,323 | 3/1993 | Oetiker | 285/258 X |

Primary Examiner—Dave W. Arola
Attorney, Agent, or Firm—Flynn, Thiel, Boutell & Tanis

[57] ABSTRACT

There are described a coupling having the bullet-shaped projections on a cylindrical holding portion for preventing a hose from coming off from the holding portion and a method of manufacturing the same. The coupling is capable of preventing the hose from being broken by the projections thereof by rounding the end edges of the projections, which leads to stability of the coupling for a long time.

3 Claims, 3 Drawing Sheets

METHOD OF MANUFACTURING COUPLINGS

BACKGROUND OF THE INVENTION

1. Field of the Invention

The present invention relates to couplings and a method of manufacturing the same with which elastic deformable hoses such as a rubber hose, synthetic resin hose, etc. engage, and more particularly to the structures of the couplings and the method of manufacturing the couplings capable of preventing the hose from coming off from the coupling and capable of preventing the same hose from being broken.

2. Prior Art

A prior art tube such as a water hose or gas hose comprises a metallic coupling, a hose which engages with the metallic coupling and a fastening ring which fastens the periphery of the hose to thereby prevent the hose from coming off from the coupling.

However, such a prior art tube using the fastening ring can not completely prevent the hose from coming off from the coupling, depending on pressure applied to the hose.

To improve the above drawback, the present applicant has proposed a coupling which is disclosed in Japanese Laid-Open Patent Publication No. 3-134396 and is illustrated in FIG. 5.

In FIG. 5, three bullet-shaped projections 3 project in equal intervals from the outer periphery of a cylindrical holding portion 2 of a coupling 1 and a hose 4 formed of an elastic deformable material engages with the holding portion 2. Each of the projections 3 has a projection wall 3a. A fastening ring 5 is wound around the outer periphery of the hose 4 to fasten the hose 4.

With such an arrangement, the hose 4 is hard to come off from the coupling 1 since the fastening ring 5 hits against each projection 3.

However, it has revealed that the following problems are liable to occur in the prior art tube described above.

That is, since each end edge 3b of the projecting wall 3a is pointed, there was such a drawback that the end edge 3b broke the hose 4 as denoted at the breakage 4a from which liquid leaks during long use of the hose.

SUMMARY OF THE INVENTION

Accordingly, it is an object of the present invention to provide couplings (hereinafter referred to simply as a coupling) capable of improving the prior art coupling and also capable of preventing a hose from being broken and a method of manufacturing the same.

To achieve the above object, it is a first aspect of the invention to provide a coupling comprising a cylindrical holding portion with which an elastic deformable hose engages, a plurality of bullet-shaped projections which project from the outer periphery of the holding portion for preventing the hose from coming off from the holding portion when the hose engages with the holding portion and a fastening ring which is wound around the outer periphery of the hose for surely preventing the hose from coming off from the holding portion wherein the bullet-shaped projections each have projecting walls end edges of which are rounded.

Another aspect of the invention is to provide a method of manufacturing a coupling comprising a cylindrical holding portion with which a hose engages, a plurality of bullet-shaped projections which project from the outer periphery of the holding portion for preventing the hose from coming off from the holding portion when the hose engages with the holding portion and a fastening ring which is wound around the outer periphery of the hose for surely preventing the hose from coming off from the holding portion, the method comprising the steps of providing an inner mold having bullet-shaped projections inside the holding portion, providing an outer mold having bullet-shaped recesses outside the holding portion, defining a difference in level having a given length between the position where projecting walls of said inner mold is positioned and the position where projecting walls of said outer mold is positioned wherein the inner mold is expanded toward the outer mold to thereby form the bullet-shaped projections on the holding portion having projecting walls end edges of which are rounded.

PREFERRED EMBODIMENT OF THE INVENTION

A coupling according to a preferred embodiment of the present invention will be described hereinafter with reference to FIGS. 1 to 3.

A coupling 11 is formed of a seamless steel pipe and has such a structure that it is neither cracked nor broken even if the diameter of the pipe is enlarged or reduced.

The coupling 11 has a cylindrical holding portion 12 in the tip end thereof. Three projections 13 project from the outer periphery of the holding portion 12. Each projection 13 has a bullet shape which is tapered off to a point toward the tip end of the holding portion 12.

Figure 5:
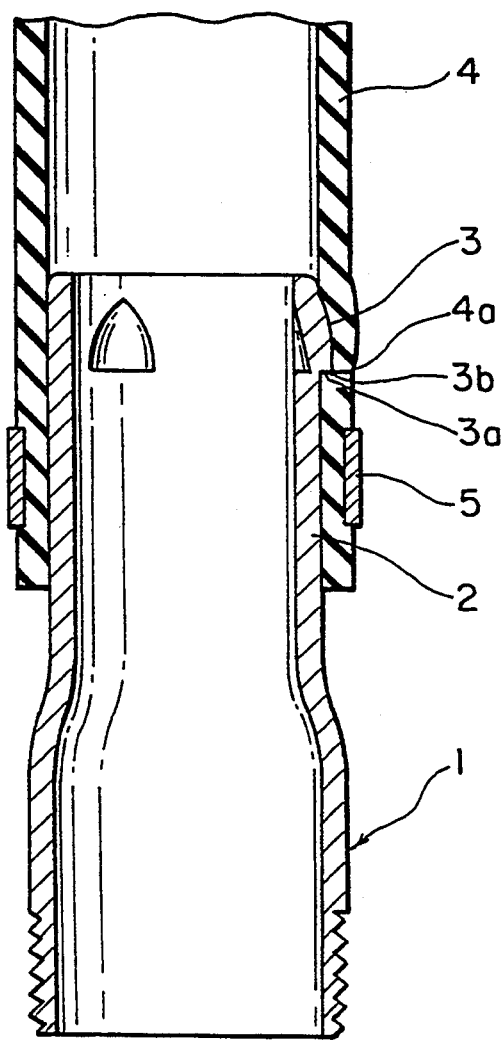
FIG. 5 is a cross-sectional view showing a prior art coupling.

A hose engages with the periphery of the holding portion 12 and a fastening ring fastens the outer periphery of the hose in the same way as the prior art coupling in FIG. 5, but the detailed description thereof is omitted.

It is a feature of the present invention that the projections 13 have the following structure.

The projections 13 have projecting walls 13a at the rear ends thereof. End edges 13b of the projecting walls 13a are rounded in circular arc differing from the prior art end edges (as denoted at 3b in FIG. 5).

According to the coupling 11 of the present invention, since the end edges 13b of the projections 13 are rounded, a hose (not shown) is not broken by the end edges 13b of the projections 13 even if the coupling 11 is used for a long time.

An example of the method of manufacturing the coupling, more particularly manufacturing bullet-shaped projections 13 of the coupling is described with reference to FIG. 4.

Figure 4:
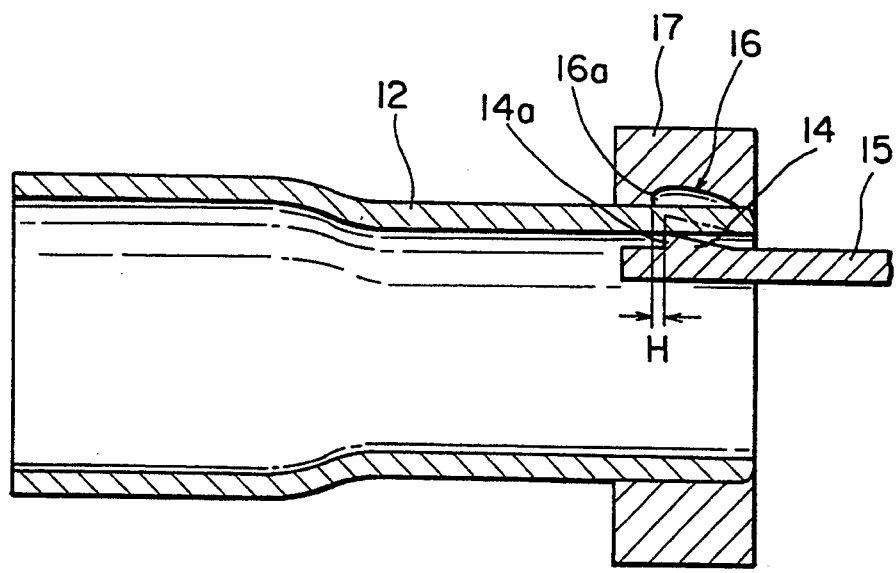
FIG. 4 is a cross-sectional view showing an example of a method of manufacturing the coupling of FIG. 1.

FIG. 4 shows molds by which the projections 13 are manufactured. An inner mold 15 having bullet-shaped projections 14 is provided inside the holding portion 12 while a ring-shaped outer mold 17 having bullet-shaped recesses 16 is provided outside the holding portion 12. A difference or offset H in level having a given length is defined between the position where projecting walls 14a of the inner mold 15 is positioned and the position where projecting walls 16a of the outer mold 17 is positioned.

Figure 1:
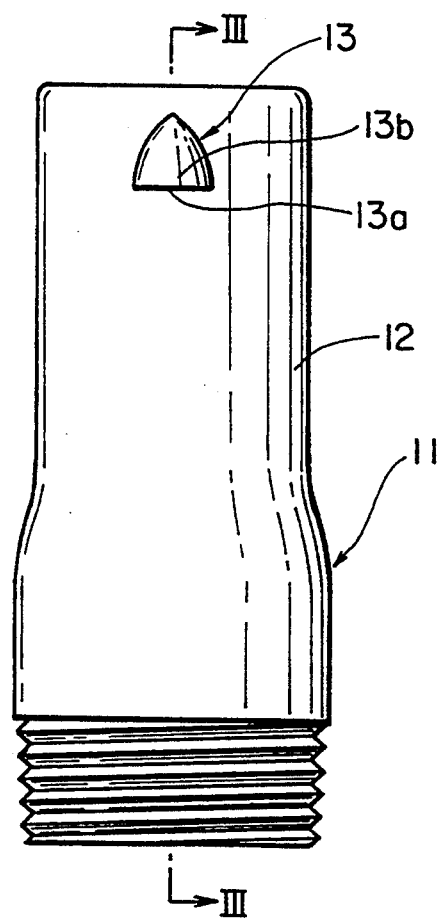
FIG. 1 is a front view of a coupling according to a preferred embodiment of the present invention.
Figure 2:
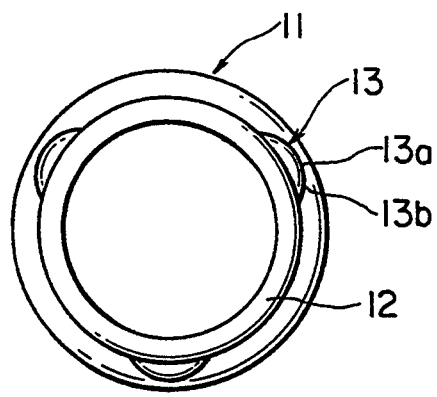
FIG. 2 is a plan view of the coupling of FIG. 1.
Figure 3:
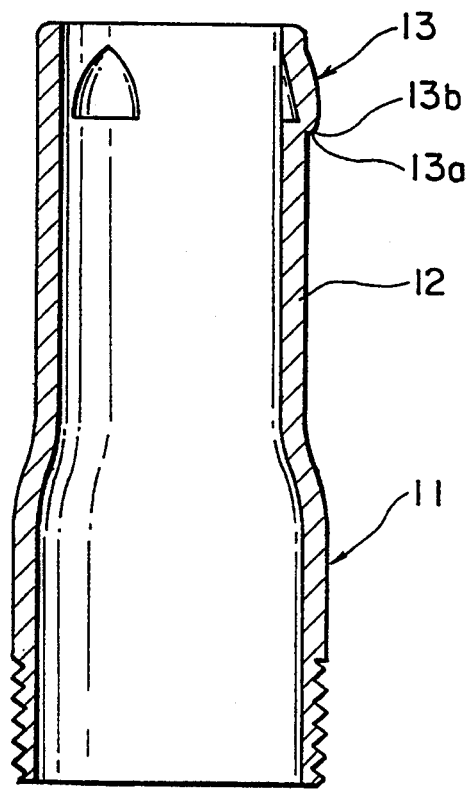
FIG. 3 is a cross-sectional view taken along III—III of FIG. 1.

At this state, when the inner mold 15 is expanded toward the outer mold 17, the bullet-shaped projections 13 are formed on the holding portion 12 wherein each projection 13 has the projecting wall 13a end edge 13b thereof is rounded as illustrated in FIGS. 1 to 3.

The present invention described above has the following effect.

Since the end edges of the projecting walls of the bullet-shaped projections are round, a hose is not broken by the end edges. Therefore, it is possible to obtain the coupling capable of preventing the hose from being broken by the end edge of the projection thereof and preventing liquid or gas from leaking, which leads to stability of the coupling for a long time use.

According to the method of manufacturing the coupling of the present invention, the bullet-shaped projections having the projecting walls end edges of which are rounded can be manufactured by only one step, the coupling can be manufactured quickly at low cost.

What is claimed is:

1. A method of manufacturing a coupling having a cylindrical holding portion with which a hose engages, a plurality of circumferentially space-apart bullet-shaped projections which project radially outwardly from an outer periphery of the holding portion for preventing the hose from detaching from the holding portion, and a fastening ring which is wound around an outer periphery of the hose axially inwardly from the projections for further preventing the hose from detaching from the holding portion, said method comprising the steps of:

providing an inner mold inside the holding portion, the inner mold having a plurality of bullet-shaped molding portions projecting radially outwardly therefrom; each molding portion defined in part by a first radially extending wall;

providing an outer mold outside the holding portion, the outer mold having a plurality of radially inwardly facing bullet-shaped recesses formed therein, the recesses each having a second radially extending wall which is axially inwardly offset from said first radially extending wall of the respective inner molding portion; and urging the inner mold radially outwardly so that the molding portions deform the cylindrical holding portion radially outwardly into conforming abutment with the respective recesses of the outer mold to form the bullet-shaped projections each having a third radially extending wall with a rounded end edge to prevent damage to the hose, the axial offset between the first and second radially extending walls facilitating formation of the rounded end edges.

2. A coupling according to claim 1, wherein the hose is formed of an elastic deformable material.

3. A coupling according to claim 1, wherein the number of projections is three.

* * * * *